United States Patent
Pijlman et al.

(10) Patent No.: US 9,778,470 B2
(45) Date of Patent: Oct. 3, 2017

(54) MULTI-VIEW DISPLAY DEVICE

(75) Inventors: Fetze Pijlman, Eindhoven (NL); Jan Van Der Horst, Eindhoven (NL)

(73) Assignee: KONINKLIJKE PHILIPS ELECTRONICS N.V., Eindhoven (NL)

( * ) Notice: Subject to any disclaimer, the term of this patent is extended or adjusted under 35 U.S.C. 154(b) by 632 days.

(21) Appl. No.: 13/824,446

(22) PCT Filed: Sep. 19, 2011

(86) PCT No.: PCT/IB2011/054081
§ 371 (c)(1),
(2), (4) Date: Sep. 24, 2013

(87) PCT Pub. No.: WO2012/038876
PCT Pub. Date: Mar. 29, 2012

(65) Prior Publication Data
US 2014/0009704 A1    Jan. 9, 2014

(30) Foreign Application Priority Data

Sep. 22, 2010 (EP) .................................. 10178274

(51) Int. Cl.
*G02F 1/1335* (2006.01)
*G02B 27/22* (2006.01)
(Continued)

(52) U.S. Cl.
CPC ..... *G02B 27/2214* (2013.01); *G02F 1/13471* (2013.01); *G02F 1/133526* (2013.01);
(Continued)

(58) Field of Classification Search
None
See application file for complete search history.

(56) References Cited

U.S. PATENT DOCUMENTS

| 5,910,706 A | 6/1999 | Stevens |
| 6,069,650 A | 5/2000 | Battersby |
| (Continued) | | |

FOREIGN PATENT DOCUMENTS

| CN | 101118316 A | 2/2008 |
| CN | 101114055 A | 8/2008 |
| (Continued) | | |

OTHER PUBLICATIONS

T. Hoefler et al: "Modifying the Output Characteristics of an Organic Light-Emitting Device by Refractive-Index Modulation", Advanced Functional Materials, Wiley-V C H Verlag GMBH & Co. KGAA, DE, vol. 16, No. 18, Dec. 4, 2006, pp. 2369-2373, XP001504252.

(Continued)

*Primary Examiner* — Jessica M Merlin
*Assistant Examiner* — Mark Teets

(57) ABSTRACT

A multi-view display is switchable between single view and multi-view modes, and uses lenticular arrangement over a display panel which includes birefringent electro-optic material adjacent to a non-switchable optically transparent layer. The non-switchable optically transparent layer has a refractive index substantially equal to the extra ordinary refractive index of the birefringent electro-optic material. In the single view mode, the birefringent electro-optic material defines a non-switched state, and the polarization of the light from the display panel and incident on the lenticular arrangement is linear and aligned with the optical axis of the birefringent electro-optic material at the surface where the display output light is received. In the multi-view mode, the birefringent electro-optic material defines a switched state in which the optical axis is aligned perpendicularly to the display output surface.

14 Claims, 4 Drawing Sheets

(51) Int. Cl.
*G02F 1/29* (2006.01)
*G02F 1/1347* (2006.01)
*H04N 13/04* (2006.01)
*G02B 3/12* (2006.01)

(52) U.S. Cl.
CPC .............. *G02F 1/29* (2013.01); *G02B 3/12* (2013.01); *H04N 13/0404* (2013.01); *H04N 13/0452* (2013.01); *H04N 13/0454* (2013.01)

(56) References Cited

U.S. PATENT DOCUMENTS

| | | |
|---|---|---|
| 6,841,802 B2 | 1/2005 | Yoo |
| 7,196,467 B2 | 3/2007 | Takamura et al. |
| 7,199,845 B2 | 4/2007 | Koyama et al. |
| 7,209,097 B2 | 4/2007 | Suyama |
| 7,269,062 B2 | 9/2007 | Liao et al. |
| 7,332,369 B2 | 2/2008 | Veres et al. |
| 7,492,092 B2 | 2/2009 | Yamauchi |
| 7,564,063 B2 | 7/2009 | Cok |
| 7,629,061 B2 | 12/2009 | Gupta et al. |
| 7,855,506 B2 | 12/2010 | Kato et al. |
| 7,897,482 B2 | 3/2011 | Toriumi |
| 8,129,611 B2 | 3/2012 | Kobayashi et al. |
| 8,179,036 B2 | 5/2012 | Eser et al. |
| 2003/0057417 A1 | 3/2003 | Lee |
| 2004/0119403 A1 | 6/2004 | McCormick et al. |
| 2004/0130503 A1 | 7/2004 | Hamagishi |
| 2004/0188690 A1 | 9/2004 | Noguchi |
| 2004/0240777 A1* | 12/2004 | Woodgate .......... G02B 27/2214 385/16 |
| 2006/0098296 A1 | 5/2006 | Woodgate et al. |
| 2007/0008617 A1 | 1/2007 | Shestak et al. |
| 2007/0096112 A1 | 5/2007 | Hoshi |
| 2008/0122347 A1 | 5/2008 | Lee |
| 2008/0186585 A1 | 8/2008 | Mino et al. |
| 2008/0203902 A1 | 8/2008 | De Kok et al. |
| 2008/0225373 A1* | 9/2008 | Hamagishi .......... H04N 13/0454 359/240 |
| 2008/0265757 A1 | 10/2008 | Forrest et al. |
| 2008/0272689 A1 | 11/2008 | Ide et al. |
| 2008/0284844 A1 | 11/2008 | Woodgate et al. |
| 2009/0033812 A1* | 2/2009 | Ijzerman .......... G02B 27/2214 349/15 |
| 2009/0280586 A1 | 11/2009 | Coe-Sullivan |
| 2011/0011148 A1 | 1/2011 | Chen |

FOREIGN PATENT DOCUMENTS

| | | |
|---|---|---|
| EP | 1750459 A2 | 2/2007 |
| GB | 2317295 A | 7/1997 |
| JP | 2000036391 A | 2/2000 |
| JP | 2002110361 A | 4/2002 |
| JP | 2003031355 A | 1/2003 |
| JP | 2004265641 A1 | 9/2004 |
| JP | 2009122586 A | 6/2009 |
| WO | 2004004362 A1 | 1/2004 |
| WO | 2004059565 A1 | 7/2004 |
| WO | 2007099488 A1 | 9/2007 |
| WO | 2008075249 A1 | 6/2008 |

OTHER PUBLICATIONS

M. Kitamura et al; "Enhanced Luminance Efficiency of Organic Light-Emitting Diodes With Two-Dimensional Photonic Crystals", Japanese Journal of Applied Physics, Japan Society of Applied Physics, vol. 44, No. 4B, Apr. 1, 2005, pp. 2844-2848, XP001245861.

Ghassan E. Jabbour; "Screen Printing for the Fabrication of Organic Light-Emitting Devices", IEEE Journal on Selected Topics in Quantum Electronics, vol. 7, No. 5, Sep./Oct. 2001, pp. 769-773.

Leeann Kim et al; "Contact Printing of Quantum Dot Light-Emitting Devices", Nano Letters, Nov. 19, 2008.

Hiroyuki Okada et al: "Self-Alignment Technologies of Organic Electronic Devices and Its Integrated Panels", Journal of Photopolymer Science and Technology, vol. 18, No. 1, 2005, pp. 79-92.

Daisuke Yokoyama et al; "Spectrally Narrow Emissions at Cutoff Wavelength From Edges of Optically and Electrically Pumped Anisotropic Organic Films", Journal of Applied Phys. vol. 103, pp. 103-123, 2008.

Marc Verschuuren et al; "3D Photonic Structures by Sol-Gel Imprint Lithography", Mater. Res. Soc. Symp. Proc., vol. 1002, 2007, pp. 7-12.

Daniel Kafer et al; "A Comprehensive Study of Self-Assembled Monolayers of Anthraceneethiol on Gold: Solvent Effects, Structures, and Stability", Journal Am. Chem. Soc., vol. 128, No. 5, 2006, pp. 1723-1732.

Stephen Y. Chou et al; "Nanoimprint Lithography", Journal Vac. Sci. Technol., 1996, B, vol. 14, No. 6, pp. 4129-4133.

Helmut Schift; "Nanoimprint Lithography: An Old Story in Modern Times? A Review", Journal Vac. Sci. Technol. B, vol. 26, No. 2, Mar./Apr. 2008, pp. 458-480.

Jan Haisma et al; "Mold-Assisted Nanolithography: A Process for Reliable Pattern Replication", Journal Vac. Sci. Technology, 1996, B, vol. 14, No. 6, pp. 4124-4128.

Ulrich Denker "Organic Semiconductor Sources: Hybrid Oleds Combine Vapor Deposition With Solution Processing" Laser Focus Works Sep. 1, 2008.

\* cited by examiner

MULTI-VIEW DISPLAY DEVICE

FIELD OF THE INVENTION

This invention relates to a multi-view display device, of the type that comprises a display panel having an array of display pixels for producing a display and lenticular means, arranged over the display panel and through which the display pixels are viewed.

BACKGROUND OF THE INVENTION

There are two basic types of multi-view display device. One type is display devices for simultaneously presenting different images to different viewers at different spatial locations. For example, one viewer can be in the driver's seat of a vehicle and another can be in the passenger's seat. The driver can be displayed driver-related content such as satellite navigation content, and the passenger can be displayed entertainment content. There may be more than two views, for multiple viewers.

Another type is autostereoscopic displays for displaying the views for different eyes to different spatial locations. There may be two views, for a single viewer at a single position, but there may be many more views (e.g. 9 or 15) so that multiple viewers can be in the field of view and/or so that a viewer can move relative to the display to experience a look around effect.

The principles behind the generation and spatial separation of the different views are the same in these devices. Essentially, different 2D content is projected to different spatial locations simultaneously. The only difference is that the angular separation of views is typically less for the autostereoscopic display (approximately 2 degrees) than for multi-view displays, where both eyes of a viewer receive the same image. Typically, the different spatial locations extend along a horizontal line, since viewers' eyes are generally at the same vertical height, but at different horizontal positions with respect to the display. For the purposes of explanation, the invention will be described with reference to autostereoscopic display devices.

A known autostereoscopic display device comprises a two-dimensional liquid crystal display panel having a row and column array of display pixels acting as a spatial light modulator to produce the display. An array of elongate lenticular elements extending parallel to one another overlies the display pixel array, and the display pixels are observed through these lenticular elements. The lenticular elements are provided as a sheet of elements, each of which comprises an elongate semi-cylindrical lens element. The lenticular elements extend in the column direction of the display panel, with each lenticular element overlying a respective group of two or more adjacent columns of display pixels.

In an arrangement in which, for example, each lenticular element is associated with two columns of display pixels, the display pixels in each column provide a vertical slice of a respective two-dimensional sub-image. The lenticular sheet directs these two slices and corresponding slices from the display pixel columns associated with the other lenticular elements, to the left and right eyes of a user positioned in front of the sheet, so that the user observes a single stereoscopic image. The sheet of lenticular elements thus provides a light output directing function.

In other arrangements, each lenticular element is associated with a group of, say, four or more adjacent display pixels in the row direction. Corresponding columns of display pixels in each group are arranged appropriately to provide a vertical slice from a respective two-dimensional sub-image. As a user's head is moved from left to right a series of successive, different, stereoscopic views are perceived creating, for example, a look-around impression.

The above-described device provides an effective three-dimensional display. However, it will be appreciated that, in order to provide stereoscopic views, there is a necessary sacrifice in the horizontal resolution of the device (the same applies to the resolution of the different images in a multi-view 2D system). This sacrifice in resolution is unacceptable for certain applications, such as the display of small text characters for viewing from short distances or graphics applications needing a high resolution. For this reason, it has been proposed to provide an autostereoscopic display device that is switchable between a two-dimensional (2D) mode and a three-dimensional (3D stereoscopic) mode. Such a device is described in U.S. Pat. No. 6,069,650, the entirety of which is incorporated herein by reference. In this device, different groups of pixels, forming one or more stereoscopic pairs, are seen by respective eyes of a viewer through the lenticular elements. The lenticular elements include electro-optic material having a refractive index that is switchable in order to enable removal of the refracting effect of the lenticular elements.

In the two-dimensional mode, the lenticular elements of the switchable device operate in a "pass through" mode, i.e. they act in much the same way as would a flat sheet of optically transparent material. The resulting display has a high resolution, equal to the native resolution of the display panel, which is suitable for the display of small text characters from short viewing distances. The two-dimensional display mode cannot, of course, provide a stereoscopic image.

In the three-dimensional mode, the lenticular elements of the switchable device provide a light output directing function, as described above. The resulting display is capable of providing stereoscopic images, but also suffers the inevitable resolution loss mentioned above.

In order to provide switchable display modes, the lenticular elements of the switchable device use an electro-optic material, such as a liquid crystal material, having a refractive index that is switchable between two different values for polarized light. The device is then switched between the modes by applying an appropriate electrical potential to electrode layers provided above and below the lenticular elements. The electrical potential alters the refractive index of the lenticular elements in relation to that of an adjacent optically transparent layer. Alternatively, the adjacent optically transparent layer may be formed of the electro-optic material, with the same result that the refractive index of the lenticular elements in relation to the optically transparent layer is altered.

Problems have been experienced, however, with unwanted display artefacts in the 2D mode of a switchable multiview/single view display when viewed at oblique angles. At such angles, a visible structure is present in the display output that appears to be related to the structure of the lenticular sheet, while no such structure is visible when viewing orthogonal to the plane of the display panel and the lenticular array.

A number of different approaches have been suggested for addressing this problem. For example, WO2007/099488 discloses the use of a birefringent (non switchable) replica structure adjacent the switchable birefringent lens structure. By forming the optically transparent layer of the lenticular means from birefringent material, considerable improvement in the reduction of the aforementioned unwanted display artefacts in 2D mode displays at oblique angles can be achieved. However, the additional complexity of a birefringent replica structure is needed. There are also other solutions to improve the image quality at lateral viewing angles, but these solutions all introduce additional complexity to the display.

SUMMARY OF THE INVENTION

There is a need for a multiview display that addresses the aforementioned problem. The aforementioned problem is solved with the invention as defined in the independent claims. The dependent claims define advantageous embodiments.

According to the invention there is provided a display device as claimed in claim 1.

In this arrangement, a switchable birefringent electro-optic material and a non-switchable optically transparent layer are again used. The switchable birefringent electro-optic material implements a function of aligning the linear polarization of the light incident on the non-switchable optically transparent layer into a given direction, for the single view (e.g. 2D) mode of operation. The non-switchable optically transparent layer has a refractive index substantially equal to the extra ordinary refractive index of the birefringent electro-optic material. This alignment can involve a polarization twisting function, if the output polarization of the display panel is not in the desired direction.

The polarization of the light output from the display panel is linear and aligned with the optical axis of the birefringent electro-optic material, which then implements the polarization twist if required, for example to make the polarization linear and in the direction of the lenticular lenses. In the description of this invention the optical axis is, as is usually defined in optical theory, the same as the director of an LC material. It is the 'preferred direction' of molecular alignment in a volume element of a liquid crystal sample.

The term 'adjacent to' preferably means in contact with.

In one example the first state as a non-switched (i.e. non voltage requiring relaxed state) while the second state is a switched (i.e. voltage driven) state of the LC material.

In the multi-view (e.g. 3D) mode, the birefringent electro-optic material defines a state in which the optical axis is aligned perpendicularly to the display output surface (homeotropically aligned).

This combination of features provides a high quality single view mode free of image artefacts in a given viewing plane, for example a horizontal viewing plane.

The electro-optic material preferably comprises a twisted nematic liquid crystal material as then the polarization twist may be provided in the LC material layers' twisted state.

The non-switchable optically transparent layer preferably comprises an isotropic material, but a birefringent material can also be used.

The display panel preferably comprises a liquid crystal display panel. These deliver polarized light. Alternatively, display panels delivering non-polarized light may be used, with the proviso that polarizing means, such as for example a linearly polarizing layer, are used to provide the polarized light for the light directing means.

This design can be used with different display types having different output polarizations. For example, the direction of the polarization of the light output from the display panel can be:
  parallel to the elongate axis of the lenticular lenses; or
  in a display column direction; or
  in a display row direction; or
  at 45 degrees to the display row and column directions.

A polarizer can be provided between the display panel output and the lenticular means. This enables use of display panels that intrinsically provide unpolarized or non-linearly polarized light such as light emitting diode (LED) panels including organic light emitting diode (OLED) panels, or plasma display panels. OLEDs are known to be light efficient, even when polarization filters are used to polarize the light of the display.

Any display has a field of view in which images displayed by it can be viewed by a viewer sitting in front of the display. The term 'full field of view' is meant to mean all locations in front of a display from which the 2D or 3D mode can be viewed. In multiview mode for multiple viewers, the display typically has multiple 2D modes each of which can be viewed by a particular viewer in only a part of the full field of view. E.g. a dual view display may have two 2D modes one to be viewed on the left half and one on the right half of the full field of view.

The invention also provides a method of controlling the display device as follows. In the single view mode, placing the birefringent electro-optic material in a non-switched state, with the polarization of the light output from the display panel linear and aligned with the optical axis of the birefringent electro-optic material at the surface where the display output light is received, and in the multi-view mode, switching the birefringent electro-optic material to a state in which the optical axis is aligned perpendicularly to the display output surface.

Further features and advantages of the present invention will become apparent from reading of the following description of preferred embodiments of the present invention, given by way of example only, and with reference to the accompanying drawings, in which:

DETAILED DESCRIPTION OF THE EMBODIMENTS

Switchable display devices having a viewable display area which may be switched between a two-dimensional display mode and a three-dimensional display mode are known. Switching between modes is achieved by applying an electric field across electro-optic material of an array of lens elements comprising an electro-optic material, such as LC material. In the two-dimensional mode, the lens elements behave as if they were an ordinary sheet of transparent material. In the three-dimensional mode, the lens elements provide a light output directing function so as to enable a stereoscopic image to be perceived. The same switching concept can be applied to a 2D multi-view display, to switch between a single view for the full field of 2D view and multiple views directed to different spatial locations such that multiple viewers can observe different 2D content in different parts of the total field of view of the display.

Figure 1:
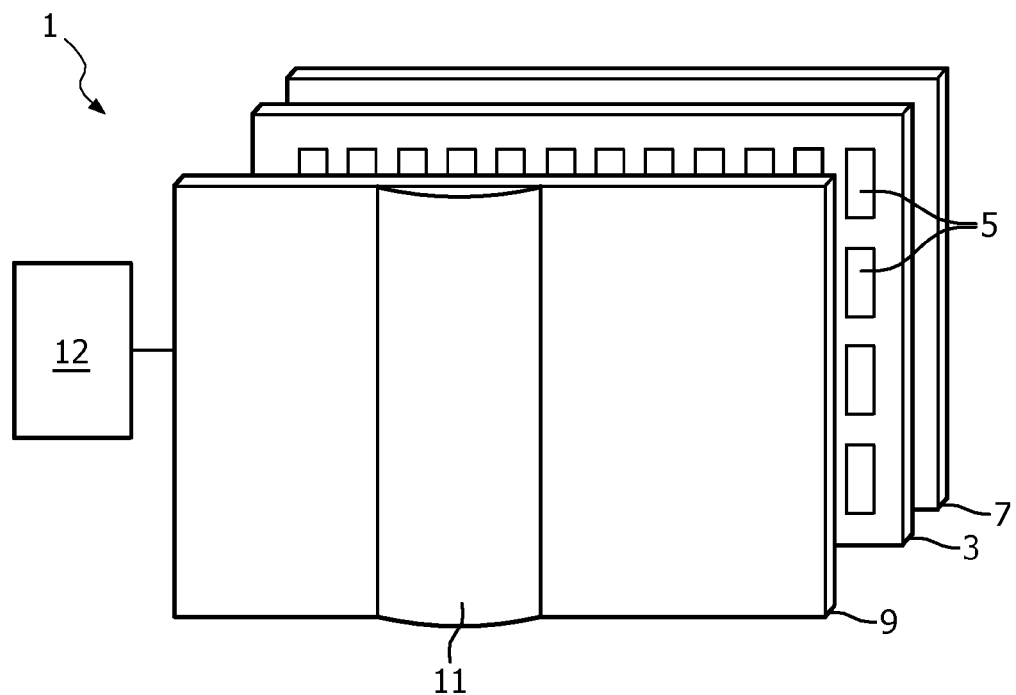
FIG. 1 is a schematic perspective view of a known autostereoscopic display device to which the invention can be applied.

FIG. 1 is a schematic perspective view of a known switchable autostereoscopic display device 1, and to which the present invention can be applied. The display device 1 is shown in expanded form.

The known device 1 comprises a liquid crystal display panel 3 of the active matrix type that acts as a spatial light modulator to produce the display. The display panel 3 has an orthogonal array of display pixels 5 arranged in rows and columns. For the sake of clarity, only a small number of display pixels 5 are shown in the FIG. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display pixel 5 comprises opposing electrodes on the substrates, with the intervening liquid crystal material between. The shape and layout of the display pixels 5 are determined by the shape and layout of the electrodes. The display pixels 5 are regularly spaced from one another by gaps.

Each display pixel 5 is associated with a switching element, such as a thin film transistor (TFT) or thin film diode (TFD). The display pixels are operated to produce a display by providing addressing signals to the switching elements, and suitable addressing schemes will be known to those skilled in the art.

The gaps between the display pixels 5 are covered by an opaque black mask. The mask is provided in the form of a grid of light absorbing material. The mask covers the switching elements and defines the individual display pixel areas.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises lenticular means comprising a lenticular element arrangement 9 positioned over the display output side of the display panel 3, which arrangement is controllable to selectively perform a view forming function. The lenticular element arrangement 9 comprises an array of lenticular elements 11 extending parallel to one another, of which only one is shown with exaggerated dimensions for the sake of clarity.

Figure 2:
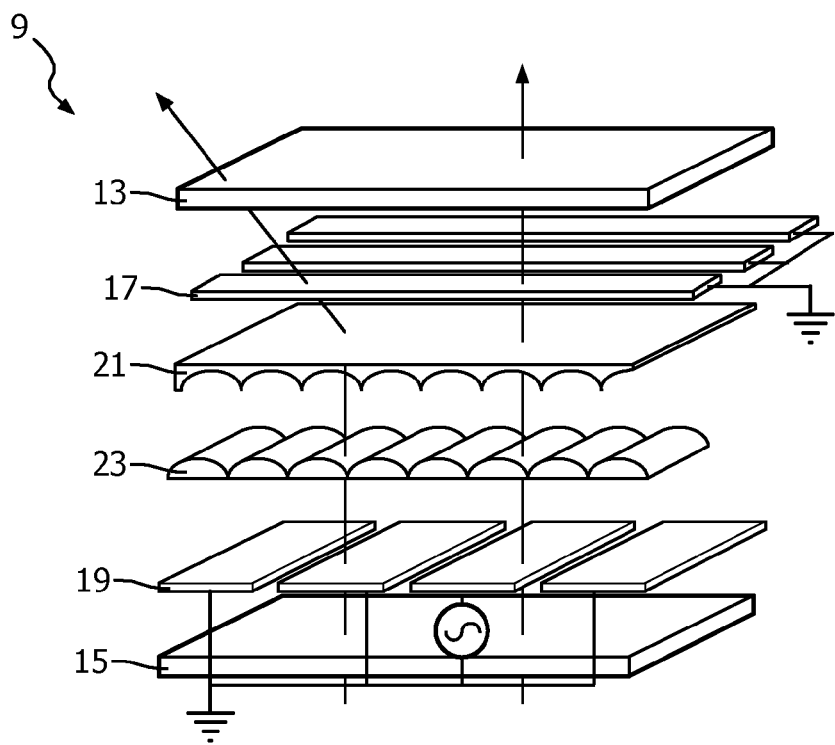
FIG. 2 is a detailed schematic view of an element of the known display device shown in FIG. 1.

The lenticular element arrangement 9 is shown schematically in more detail in FIG. 2. The arrangement 9 is shown in expanded form.

Referring to FIG. 2, it can be seen that the lenticular element arrangement 9 comprises a pair of transparent glass substrates 13, 15, with transparent electrode layers 17, 19 formed of indium tin oxide (ITO) provided on their facing surfaces. Each electrode layer 17, 19 is in the form of a plurality of parallel elongate electrodes, and electrodes of the respective different layers 17, 19 are arranged perpendicular to one another. The elongate electrodes are arranged with small gaps there between to enable them to be separately addressed.

An optically transparent layer 21 constituting a lenticular body and in the form of a sheet, or plate, having an inverse lenticular structure, is provided between the substrates 13, 15, adjacent to an upper one of the substrates 13. The lenticular body 21 is fabricated from plastics material using a replication technique. Nematic liquid crystal material 23 is also provided between the substrates 13, 15, adjacent to the lower one of the substrates 15. The inverse lenticular structure of the lenticular body 21 causes the liquid crystal material 23 to assume parallel, elongate semi-cylindrical lenticular shapes, between the lenticular body 21 and the lower substrate 15, as shown in the figure. Surfaces of the inverse lenticular structure of the body 21 and the lower substrate 15 that are in contact with the liquid crystal material 23 are also provided with an orientation layer, 25 and 26, for orientating the liquid crystal material 23.

In use, the known switchable display device 1 shown in FIG. 1 is operable to provide a display output, discrete portions of which can be switched either alone, or in combination, between two-dimensional (2D) and three-dimensional (3d) display modes. In this way, one or more two-dimensional display windows can be provided in a three-dimensional display area.

Switchability of discrete portions of the display output between the modes is achieved by applying an electric field across the lenticular elements formed of liquid crystal material 23. This electric field is generated by applying an electrical potential across electrodes of the electrode layers 17, 19.

The electrical potential is applied to a selected number of adjacent ones of the elongate electrodes in each electrode layer 17, 19. The selection of the upper electrodes defines a height of a display window that is to be switched, and the selection of the lower electrodes defines a width of the display window to be switched.

Instead of being subdivided as shown, the electrodes 17 and 19 may each be single electrodes extending continuously over the pixel array and operable by the application thereto of suitable voltages simply to switch the display output in its entirety between 2D and 3D display modes.

The applied electrical potential causes the lenticular elements in the selected portion of the display area to switch between maintaining and removing a light output directing function, which will now be explained with reference to FIGS. 3A and 3B.

Because of its static dielectric anisotropy, the orientation of the LC material can be controlled through an applied electric field. In the optical regime, there is also dielectric anisotropy and the index of refraction of the LC material is related to the relative dielectric constant. The LC material has an ordinary and an extra-ordinary index of refraction, the former being applicable for light with electric field polarization perpendicular to the director and the latter being applicable for light with electric field polarization parallel to the director.

Figure 3A:
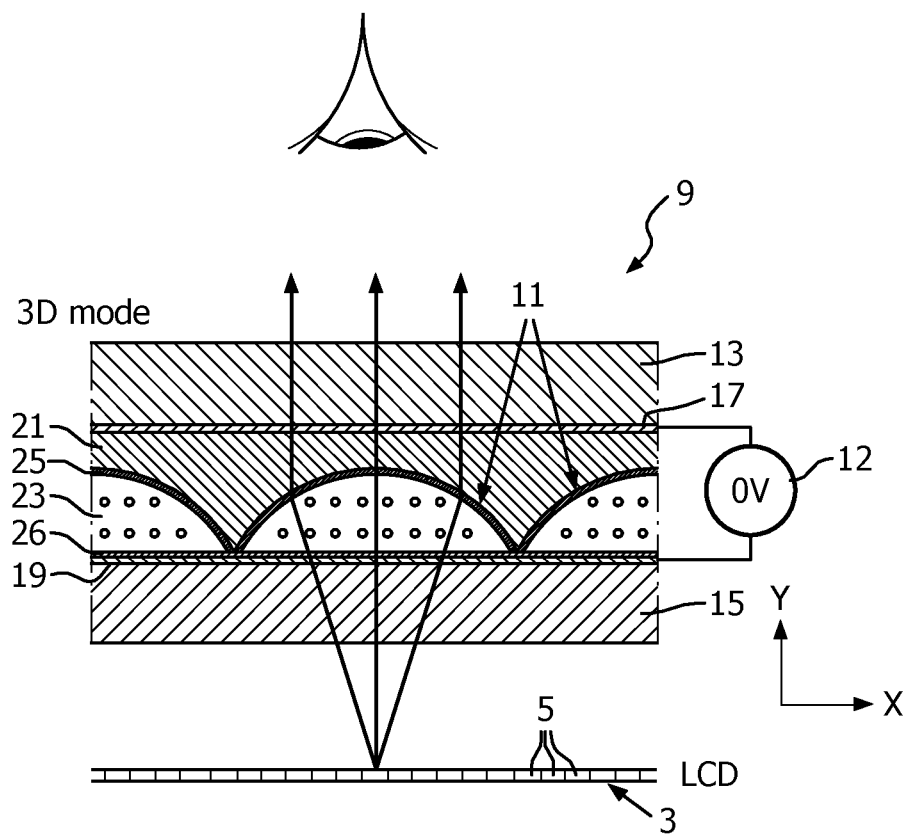
FIGS. 3A and 3B are used to explain the operating principle of the known display device shown in FIG. 1.

FIG. 3A is a schematic cross-sectional view of a portion of the lenticular element arrangement 9 when no electric potential is applied to the electrodes. Here, the rubbing directions of the orientation layers 25 and 26 and the polarization of the display light are in the z-direction (the direction of the lens axes) and in this case extending perpendicular to the plane of drawing of FIG. 3A. As a result, the effective lens, although being optically birefringent, can be approximated as an isotropic lens with an index of refraction corresponding to the extra-ordinary index of refraction of the LC material. In this state, the refractive index (that is the extra-ordinary refractive index) of the liquid crystal material 23 for linearly polarized light provided by the display panel is substantially higher than that of the body 21, and the lenticular shapes therefore provide the light output directing function, as illustrated.

Figure 3B:
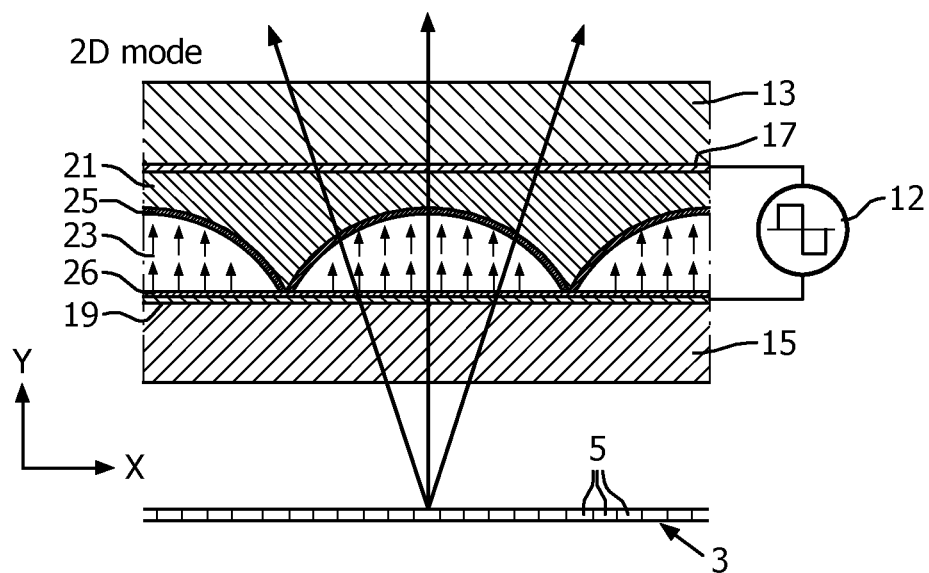

FIG. 3B is a schematic cross-sectional view of a portion of the lenticular element arrangement 9 when an alternating electric potential of approximately 50 volts is applied to the electrodes. An electric field is created in the y-direction and the LC molecules align with the field lines. As a result, the director of the LCF material is also substantially in the y-direction. The polarization direction of light from the display panel is still linearly polarized, that is, the E field of the light is in the z-direction. With the polarization of the light of the display in the z-direction, the effective lens will have the ordinary index of refraction, and light will not be refracted since there is an index match between the LC material and the lenticular body 21. In this state, therefore, the refractive index of the LC material 23 for light of the linear polarization provided by the display panel is substantially the same as that of the inverse lenticular structure of the body 21, so that the light output directing function of the lenticular shapes is cancelled, as illustrated. Thus, the array effectively acts in a "pass through" mode.

With the light output directing function maintained, as shown in FIG. 3A, the lenticular elements defined by the LC material 23 act as convex cylindrical lenses, and provide different images, or views, from the display panel 3 to the eyes of a user positioned in front of the display device 1. Thus, a three-dimensional image can be provided.

With the light output directing function removed, as shown in FIG. 3B, the lenticular elements defined by the liquid crystal material 23 act as if they were a flat sheet of transparent material that acts as a pass through layer with no view directing function. Thus, a high-resolution two-dimensional image can be provided employing the full native resolution of the display panel 3.

The control of electrical potentials to switch between display modes is provided to the electrodes of the lenticular element arrangement 9 by a controller 12.

Further details of the structure of a known switchable autostereoscopic display device can be found in U.S. Pat. No. 6,069,650, to which reference is invited.

It has been found that undesirable display artefacts are visible in the display output of this device when viewing the display in 2D mode at an oblique angle, for example at around 45 degrees with respect to the plane of the display panel. These artefacts are in the form of visible dark banding or shading lines whose structure appears to be related to that of the lenticular array. When viewing a 2D mode display output orthogonal to the display panel the artefact structure is not present. It is believed that the artefacts are due to some residual lens effect.

Figure 4:
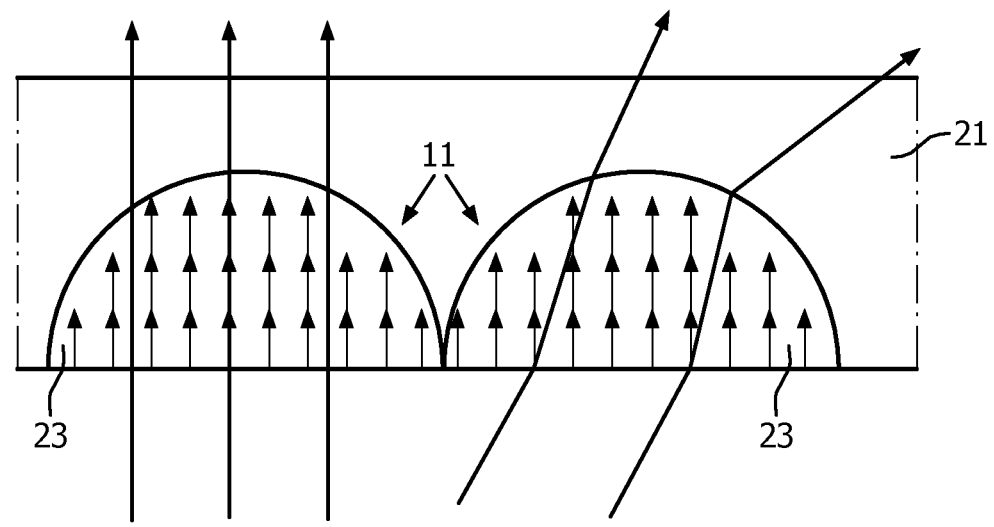
FIG. 4 is a schematic cross sectional view of two typical lenticular elements in the device of FIG. 1 depicting optical effects in operation.

The visibility of the structure may be explained as follows. In the 2D mode, a voltage is applied across the lenticular elements and the molecules of the LC material are oriented approximately orthogonal to the plane of the display panel 3. FIG. 4 illustrates schematically the applied effect of two representative lenticular elements in the array in this mode and shows the orthogonal orientation of the LC material in these elements. Light rays travelling substantially perpendicularly to the display panel and the lenticular array do not see a change of index of refraction at the lens surface (the semi-cylindrical boundary between the LC material 23 and the lenticular body 21) as the index of refraction of the LC material and the lenticular body 21 is matched, and consequently the path of the light is unaltered. This is depicted for the left side lenticular element in FIG. 4.

For oblique light rays (not normal to the lens or display panel, however, the effective index of refraction of the LC material 23 is not equal to the ordinary index of refraction (typically around 1.5) for certain polarization directions, but will have a value between the ordinary and extra-ordinary index of refraction (typically around 1.7) which value is dependent on amongst others the obliqueness of the rays. Consequently, the rays will be refracted at the curved lens surface, as depicted for the right side lenticular element in FIG. 4. Thus, due to the birefringent properties of the LC material, there is a residual lens effect when viewing the display at an oblique angle. It appears the focal length of the lenticular element is angular dependent. At normal angles, perpendicular to the display panel, the focal power is zero, whereas it increases for larger viewing angles. For a certain viewing angle, the focal point of the lenticular element is at the pixel structure of the display panel. As a result, the black matrix surrounding the pixels in the panel is imaged at infinity, and this is believed to be the cause of the visible artefact structure.

This effect is dependent on the direction of polarization of the incident light at the lens surface. In the example of FIG. 4, the light from the display is assumed to be polarized in the horizontal direction (the x direction shown in FIG. 3), namely in a direction across the lenticulars, as shown. If the light from the display is polarized in the vertical z direction as explained for the example of FIG. 3, then the optical axis of the LC material remains perpendicular to the direction of polarization at all times, and the light rays in the plane of the figure see the ordinary index of refraction at all times. In this case, there are no artefacts. Thus, the artefacts in the 2D mode are dependent on the polarization direction of the incident light.

Figure 5:
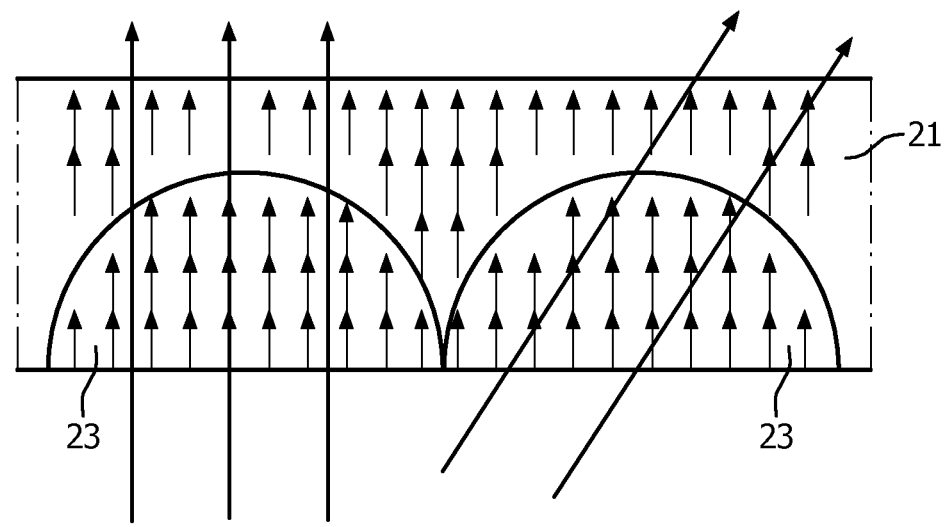
FIG. 5 is a view similar to that of FIG. 4 of part of the lenticular array in a design which uses a birefringent non-switchable lenticular replica structure.

To overcome this problem, a birefringent material can be used for the lenticular body 21. Preferably the birefringent material has the same ordinary and extra-ordinary index of refraction as the LC material. This solves the problem for all viewing angles. The effect of this is illustrated in FIG. 5 which is a cross-sectional view of a part of the lenticular array 9 comprising two typical lenticular elements 11, and similar to that of FIG. 4. The orientation of the optical axis in the lenticular body 21 is preferably in the vertical direction, as shown in FIG. 5.

In the 3D mode of operation light from the display panel is polarized such that refraction is obtained at the lens surface. The light rays see the extra-ordinary index of refraction in the LC material 23 and the ordinary index of refraction in the lenticular body 21.

In the 2D mode of operation, as depicted in FIG. 5, a voltage is applied across the lenticular elements and the LC material molecules are again oriented in the y direction. In this mode, the ordinary and extra-ordinary index of refraction of the LC material and the material of the lenticular body 21 match and there is no refraction at the lens surface. The lenticular element 11 to the left in FIG. 5 depicts the effects for light travelling normally to the display while the lenticular element 11 to the right depicts the effects for light travelling obliquely. As can be seen, in both cases the light rays do not see a change of index of refraction at the lens surface and are not refracted.

In particular, the optically transparent layer comprises a birefringent material having birefringence between a first direction normal to a surface of the display panel, and a second lateral direction in the plane of the surface.

In greater detail, the LC material 23 inside the lenticular element 11 can be approximated by a homogeneous uniaxially anisotropic medium. The propagation of light in uniaxially anisotropic media can be described by two independent modes of polarization. The index of refraction of each independent mode depends on the direction of polarization and the direction of propagation with respect to the optical axis of the birefringent medium. The ordinary (O) wave, with ordinary index of refraction, has a direction of polarization perpendicular to the optical axis and a wave vector $k_o$. The extra-ordinary (E) wave has a polarization direction perpendicular to the polarization direction of the O wave. The extra-ordinary index of refraction of the E wave is dependent on the angle, $\Theta$, between the wave vector $k_e$ and the optical axis.

It is possible to discriminate between the propagation of the O wave and the propagation of the E wave. For the O wave, the index of refraction does not depend on the direction of propagation. However, for the E wave, there is a variation in index of refraction, depending on the direction of propagation with respect to the optical axis. In other words, the index of refraction depends on the viewing angle as well. If the angle $\Theta$ increases, the effective index of refraction increases as well. For a certain viewing angle, the refractive power of the lenticular has reached a value where the focal point of the switchable lenticular is exactly at the pixel structure of the display panel.

Another solution to the problems discussed above is to use graded refractive index lens (GRIN lenses). In this case, the control of the switchable LC material is performed locally so that lens shapes are defined by the LC molecule orientation. When turned off, there is no lens shape defined, so that the structure is insensitive to the direction of light propagation through the lens.

The different approaches above lead to different performances in respect of viewing angle dependence. The angular dependence of the approach of FIG. 4 depends on the polarization of the display. At present some displays are being produced where the polarization is diagonal over the display. For these displays neither the horizontal or vertical plane give good viewing angle dependencies.

The invention aims to address the problem of image artefacts in the 2D mode at wide viewing angles, without significantly complicating the display design, and in a way which can be adapted to different output polarizations from the display panel.

There are two modes of the LC: homeotropically aligned (perpendicular to the surfaces of the display) and planar to the surfaces.

In the arrangement of FIG. 3, in the 2D mode (FIG. 3B) the liquid crystal is homeotropically aligned, and in the 3D mode (FIG. 3A) the liquid crystal is planar aligned.

Figure 6A:
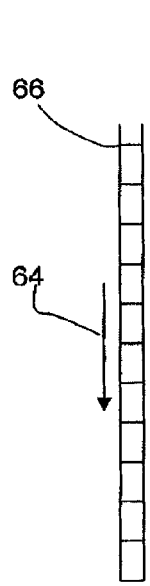
FIGS. 6A and 6B show a display device of the invention in the 2D and 3D modes.
Figure 6A:
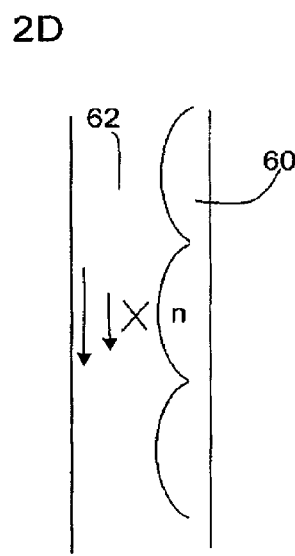
Figure 6B:
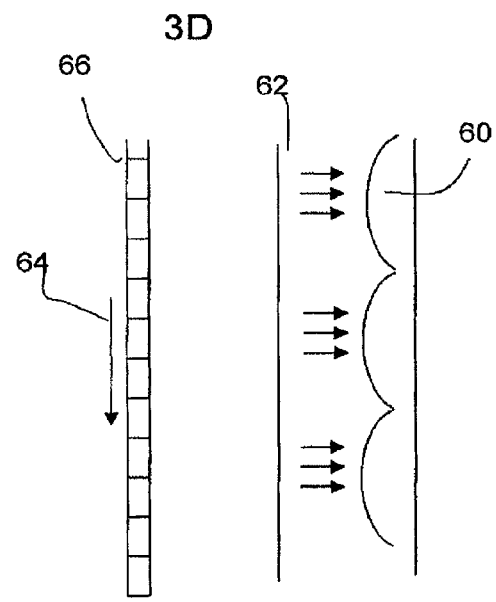

FIG. 6 is a schematic figure showing the configuration according to the invention. FIG. 6A shows the 2D mode and FIG. 6B shows the 3D mode.

In the example shown, the polarization 64 of the display 66 is linear and in the plane of the display (for normally emitted light i.e. light emitted perpendicular to the display plane). In the description below, if the polarization is said to be in the plane of the display, this relates to normally emitted light from the display panel (i.e. light emitted perpendicularly with regard to the display panel)—since linearly polarized light emitted laterally will have a polarization direction perpendicular to the direction of propagation, and therefore no longer in the plane of the display.

Other than for the different features indicated here below, the display of the example may be built up as described for the display of FIGS. 2 and 3.

The lenticulars 60 are non-switchable and preferably isotropic, and the switchable LC cell 62 is used for the replica part of the lens.

The index (n) of the isotropic lenticular 60 is matched to the extra ordinary index of refraction of the LC 62. The extra-ordinary index of refraction is often higher than the ordinary index of refraction, and the lenses are shaped in known manner to provide the desired optical focusing in the multi-view (in this case being a 3D) mode. In particular, as the extra-ordinary refractive index is usually higher than the ordinary refractive index, the non-switchable optically transparent layer comprises a convex-shaped lenticular. This lenticular bulges into the switchable birefringent layer. As the shape is convex, the amount of liquid crystal of the switchable layer can be made smaller than with the usual concave shaped non-switchable optically transparent layers. This saves the amount of liquid crystal material and reduces the production costs. Thus, the lenticulars are non-switchable and the twisted LC cell is used for the replica part of the lens.

The multi-view 3D mode is based on a homeotropically aligned LC 62. In this case, the light will mainly experience the ordinary refractive index, so that there is a lens interface at the boundary between the LC ordinary refractive index and the extra ordinary refractive index of the isotropic replica.

In the 3D mode, the refractive index is angle dependent, as the angle made between the direction of polarization and the LC refractive index varies depending on the illumination direction. However, this is found not to affect adversely the 3D mode in the same way that the 2D mode is visibly affected by such artefacts. Furthermore, for large viewing angles, the lenticular is further away than for perpendicular light. The artefact give rise to a focal length of the lens that is angle dependent, and this compensates for the different path length to the pixel plane. In this way, the lens artefact in the 3D mode introduces a positive benefit in terms of the focus quality of the lateral views.

In order to switch off the lenses, the light in the 2D mode should mainly experience the extra-ordinary index of refraction so as to match the refractive index of the replica.

In one example of the arrangement of the invention, in the off-state (2D mode) the polarization of the display is rotated such that at the lens interface or at least at the light exit surface of the LC layer, the polarization of the light has a desired polarization direction. A twisted nematic LC cell is used, with the LC orientation aligned with the polarization direction of the display output at the display side. In the example shown in FIG. 6A, the polarization 64 of the display output is again shown in the plane of the display. This may be along the lens axes or across the lenses.

In the 2D mode, the twist results in a polarization direction orientation in the plane of the display and in a desired direction for match with the refractive index of the lenticular lens body.

Best horizontal performance can be obtained by aligning the LC parallel to the cylinder axis of the lenticular lenses after the twist. This is the alignment shown in FIG. 6A and FIG. 6B, and it means image artefacts are not introduced to the lateral viewing angles.

In particular, when the optical axis of the switchable birefringent layer at the surface of the optically transparent layer is aligned along the orientation of the lenticular, the angular artefacts in the 2D mode can be removed. The angle between the polarization direction and the optical axis of the LC is substantially constant (i.e. zero) for a viewing plane that is perpendicular to the orientation of the lens structure. This viewing plane is substantially horizontal, so that this matches the way in which the displays are used. This can be achieved irrespective of the native polarization of the panel.

Best vertical performance could be obtained by aligning the LC (after the twist) across (i.e. perpendicular to) the cylinder axis of the lenticulars and again parallel to the lens interface.

Thus, the invention can solve the problem of artefacts in the substantially horizontal plane irrespective of the polarization of the underlying panel. In FIG. 3B, the artefacts are mostly not visible in the horizontal plane as the polarization of the light is perpendicular to the optic axis of the LC for all these angles. However, if the polarization of the display is not aligned with the lenticular direction (as is in general the case), then these artefacts do arise. The arrangement of the invention solves this problem.

The arrangements described above use a 90 degree twist, based on an assumed output polarization of the display panel in a row direction (across the lenticulars). The invention can be applied to displays with an output polarization at 45 degrees to the row and column directions. In this case, a polarization twist of 45 degrees can be introduced by the switchable LC layer, to provide the desired polarization direction input to the non-switchable lenticular. The degree of polarization rotation is dictated by the surface alignment directions on the opposite sides of the LC layer, in known manner, and can be controlled to provide any desired degree of rotation.

If the display panel has the desired output polarization direction (for example in the column direction or the direction of the lenticulars), then no twist may be needed. In this case, the switchable LC can switch between a planar linear polarization with no twist and a homeotropic polarization alignment.

The key point is that the polarization direction at the output side of the switchable birefringent layer (i.e. at the lens interface) is linear and in the desired direction (such as parallel to the lenticular elongate axis). The linear polarization direction is parallel to the display panel for normally (perpendicular to the display panel) emitted light. The amount of angular twist required to achieve this depends on the polarization direction of the light output from the display panel.

Single view/multi view (e.g. 2D/3D) switchable displays are at present considered to be high end displays. Having artefacts in the 2D mode is considered to be unacceptable from a consumer point of view. This may be due to the fact that the consumer is most familiar with the 2D mode.

The design of the invention uses the 2D mode as a first mode to be a non-switched mode. This leads to less residual lens action (and therefore less artefacts). Theoretically, it can be argued that the problem of artefacts has been shifted to the 3D mode, but from user tests it is apparent that these artefacts are less noticeable in the 3D mode than in the 2D mode. By having the non-switched mode available for the 2D mode, the quality of the 2D mode is substantially improved.

In the example of FIG. 6, in the non-switched mode, the polarization is rotated such that it is parallel to the geometrical axis of the lenticular lenses and parallel to the optic axis of the LC. As the polarization at the surface of the lenticular lenses is aligned with the geometrical axis, no artefacts are experienced in a horizontal viewing plane (i.e. a left-right plane when viewing the display). This plane is mainly used by consumers.

The display can have an output polarization across the lenticular lenses (as in FIG. 6), along the lens axes or indeed along the diagonal of the display. The LC alignment is chosen to match the type of display.

The invention avoids the need for a birefringent replica (as in the example of FIG. 5), but a birefringent lenticular can nevertheless be used.

Figure 7:
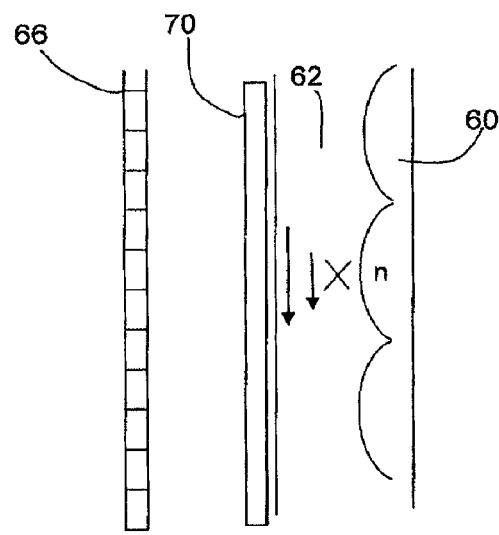
FIG. 7 shows a modification to the device of FIG. 6.

To avoid the need for the switchable lens arrangement to be designed for a specific display output polarization, a polarizer or polarization rotating element can be used between the display output and the lenticular arrangement, as the top layer of the display or the bottom layer of the lens arrangement. This use of a polarizer 70 is shown in FIG. 7. Hence also LED, OLED or plasma displays may benefit from the invention.

As explained above, the invention can be applied to displays having a single view 2D mode and either a multi-view 3D display in which each viewer may experience a 3D effect or a multi-view display presenting multiple 2D views to different locations in front of a display such that different viewers may see different content.

Although the invention has been described in detail for a multiview 3D mode, the example for a multiview 2D mode for multiple viewers may be almost the same with the important distance that the view directing means must be designed such that it directs the appropriate views to the appropriate positions in front of the display. Thus, as explained in the introduction section of this invention for the 3D display, the different columns of pixels that would be directed such as to define the different views for the left and right eyes of a viewer, should now be deflected such that they generate different views for the multiple viewers.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A multi-view display device which is switchable between a single view mode and a multiple view mode, the display comprising:
   a display panel;
   a non-switchable optically transparent layer comprising a flat side and a lens side; and
   a birefringent electro-optic material disposed between the display panel and the non-switchable optically transparent layer;
      wherein the flat side is farther from the display panel than the lens side,
      wherein the lens side comprises a plurality of lenticular lens elements,
      wherein each lens element is convex,
      wherein the non-switchable optically transparent layer has a refractive index substantially equal to the extra ordinary refractive index of the birefringent electro-optic material;

wherein a polarization direction of light from the display output side of the display panel and incident on the non-switchable optically transparent layer is linear, wherein in the single view mode the birefringent electro-optic material is in a first state in which an optical axis of the birefringent electro-optic material is aligned with the polarization direction of the light from the display panel at a surface where the light enters the birefringent electro optic material, wherein in the multi-view mode, the birefringent electro-optic material is in a second state in which the optical axis of the birefringent electro-optic material is aligned perpendicularly to a surface of the display panel.

2. The device according to claim 1, wherein the refractive index of the birefringent electro-optic material is switched by a selective application of an electric field to at least part of the birefringent electro-optic material.

3. The device according to claim 1, wherein in the single view mode the optical axis of the birefringent electro-optic material at a surface of the non-switchable optically transparent layer is aligned with elongate axes of the lenticular lens elements.

4. The device according to claim 1, wherein the birefringent electro-optic material comprises a twisted nematic liquid crystal material.

5. The device according to claim 1, wherein the display panel comprises a liquid crystal display panel.

6. The device as claimed in claim 1, wherein the non-switchable optically transparent layer comprises a birefringent material.

7. The device as claimed in claim 1, wherein the non-switchable optically transparent layer comprises an isotropic material.

8. The device as claimed in claim 1, wherein the polarization orientation of the light from the display output side of the display panel at the surface that the light enters the birefringent electro-optic material is parallel to the elongate axis of the lenticular lens elements.

9. The device as claimed in claim 1, further comprising a polarizer between the display output side and the non-switchable optically transparent layer.

10. The display as claimed in claim 1 comprising an autostereoscopic display device, wherein the single view mode comprises a two-dimensional mode, and the multi-view mode comprises a three-dimensional mode.

11. The display as claimed in claim 1 comprising a dual view display device, wherein the single view mode comprises a two-dimensional mode in a full field of view of the display, and the multi-view mode comprises two at least partly separated two-dimensional modes at different parts of the full field of view of the display.

12. The device as claimed in claim 1, wherein the polarization orientation of the light from the display output side of the display panel at the surface that the light enters the birefringent electro-optic material is in a display column direction.

13. The device as claimed in claim 1, wherein the polarization orientation of the light from the display output side of the display panel at the surface that the light enters the birefringent electro-optic material is in a display row direction.

14. The device as claimed in claim 1, wherein the polarization orientation of the light from the display output side of the display panel at the surface that the light enters the birefringent electro-optic material is at 45 degrees to the display row and column directions.

* * * * *